Oct. 17, 1967  J. T. GWINN, JR  3,347,352
VIBRATORY FEEDER AND THE LIKE
Filed Nov. 21, 1966
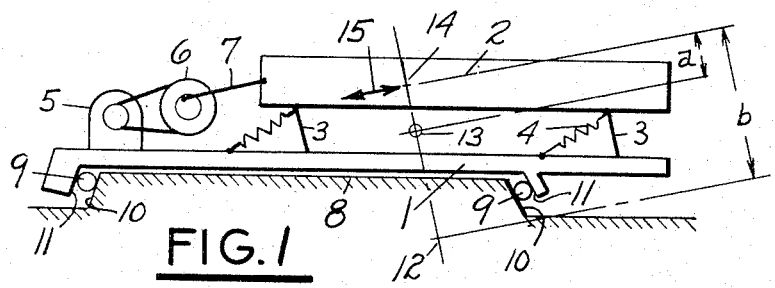
FIG. 1
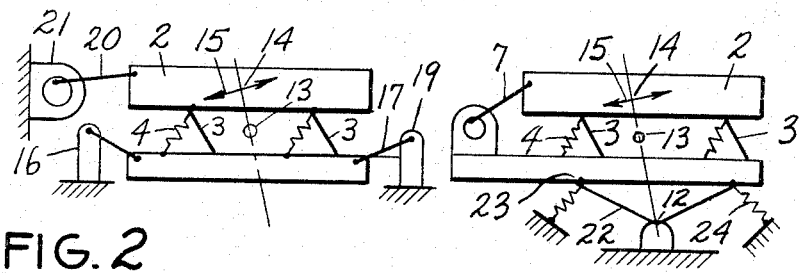
FIG. 2
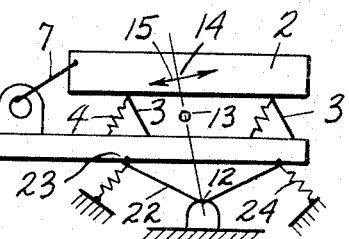
FIG. 3
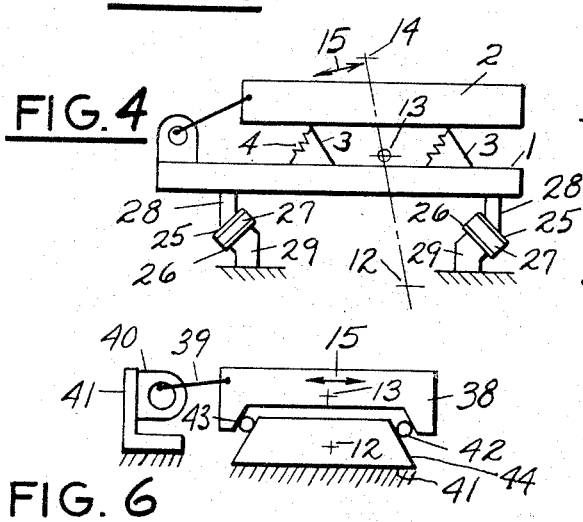
FIG. 4
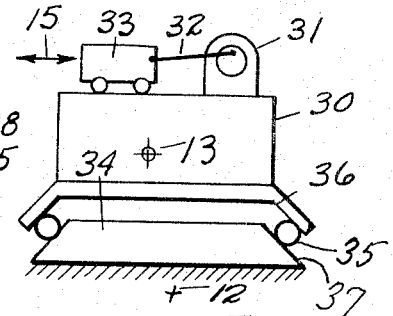
FIG. 5
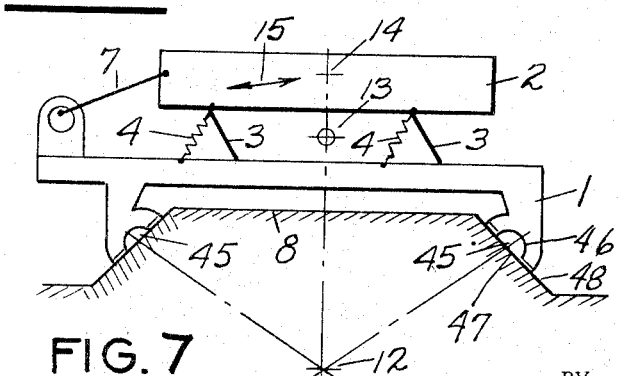
FIG. 6
FIG. 7
INVENTOR
James T Gwinn Jr
BY Ralph Hanuman
ATTORNEY

# United States Patent Office 3,347,352
Patented Oct. 17, 1967

3,347,352
VIBRATORY FEEDER AND THE LIKE
James T. Gwinn, Jr., Erie, Pa., assignor to Lord Corporation, Erie, Pa., a corporation of Pennsylvania
Filed Nov. 21, 1966, Ser. No. 595,886
12 Claims. (Cl. 198—220)

ABSTRACT OF THE DISCLOSURE

In vibratory feeders, conveyors, screens, and other devices which as a part of their normal operation are subjected to reciprocating shaking forces having a line of action in a plane vertically spaced above or below the center of gravity of the device, the transmission of the shaking forces to the supporting structure is reduced by supporting the device for free bodily rocking movement about an axis crosswise of the line of action of the shaking forces and located on the opposite side of the center of gravity so the shaking forces pass through or in the region of the center of percussion. The vibration isolation makes use of the inertia of the device and is independent of frequency.

---

This application is a continuation in part of copending application Ser. No. 425,280, now abandoned.

This invention is intended to isolate vibration of a device such as a vibrating feeder, conveyor, screen and the like or any body subjected to a reciprocating force or forces the resultant of which does not pass through the center of gravity of the device or body by supporting the device for rocking movement about an axis on the side of the center of gravity opposite the line of action of the shaking forces. Preferably the axis is such that the reciprocating or shaking forces pass through the center of percussion. With such a construction, the reciprocating forces are spent in rocking the complete device about the axis and low frequency vibrations can be effectively isolated.

In the drawing, FIG. 1 is a diagrammatic side elevation of a vibrating feeder, conveyor or screen, FIGS. 2, 3 and 4 are diagrammatic views of modifications, FIG. 5 is a diagrammatic side elevation of a device subject to reciprocating forces from a drive carried by a structure inside the device, FIG. 6 is a diagrammatic side elevation of a device subject to reciprocating forces from a drive carried by a structure outside the device, and FIG. 7 is a diagrammatic view of another modification.

In the device, vibrating feeder, conveyor or screen of FIG. 1, a base 1 supports a tray 2 by means of stabilizer links 3 and reaction springs 4. At one end of the base is a motor 5 driving a pulley 6 having a connecting rod 7 for reciprocating the tray 2.

Typically the base is an elongated unitary structure, although it may be assembled from several pieces and the tray 1 is also elongated. The function of the links 3 and springs 4 may be combined into elastomeric shear sandwiches or other structure. The function of the eccentric drive 5, 6, 7 may be performed by other means for generating reciprocating forces. The parts illustrated at 1–7, while frequently used to illustrate the basic operation of a vibrating conveyor, should be considered as an illustration of the operation and not of the physical structure.

The parts 1–7 inclusive constitute a complete device operable with the base 1 immovable fixed to a supporting structure. When so fixed, as is frequently done in locations where vibration can be tolerated, the shaking forces are transmitted directly through the base to the supporting structure.

In the device 1–7 inclusive, on the forward stroke, the tray 2 is moved upward and to the right, tossing the material up off the bottom of the tray, and on the backward stroke the tray is moved downward and to the left, so that when the material settles to the bottom of the tray it lands in a different position than at the beginning of the forward stroke. In the case of feeders and conveyors, this motion is used to advance material at controlled rates. In the case of screens, this motion is used to turn over the material so the material of the proper size can fall through the screen while the larger particles are moved to the right and off the right end of the screen. The mass of the tray and contents is large and speed of reciprocation is frequently relatively low (300 to 500 strokes per minute) and at these low speeds large shaking forces are generated which cannot be practically isolated by conventional systems of vibration isolation. This problem is common to vibrating feeders, conveyors and screens which may differ substantially in construction and appearance from the diagrammatic construction illustrated.

To isolate vibration, use is made of the inertia of the device. In a preferred form shown in FIG. 1, the base 1 is supported on a supporting structure 8 such as the floor of the building, by rollers 9 arranged between inclined surfaces 10 on the floor and complementary inclined surfaces 11 on the base 1. The surfaces 10, 11 are shown as plane and parallel to each other but may be nonparallel or curved. The combined effect of the rollers 9 and the surfaces 10, 11 is to support the base 1 for rotation about the center of rotation or axis 12 on one side of the center of gravity 13 of the device. When the device is so supported, its center of percussion 14 is on the opposite side of its center of gravity 13. The center 12 is chosen so that the lines of action of the reciprocating or shaking forces exerted by the tray on the base pass in the region of the center of percussion 14. The direction of the shaking forces is generally indicated by the arrow 15, although the direction will shift during the reciprocation of the tray. The effect of the shaking forces indicated by arrow 15 is to rock the base 1 and the tray 2 supported thereby about the axis 12. If the arrow 15 passed precisely through the center of percussion 14, there would be no tangential reaction transmitted to the floor. Acceptable results are obtained if the line of action 15 of the shaking forces is near the center of percussion 14. By this arrangement, the shaking forces are spent in rocking the complete device about the center 12 and objectionable transmission of vibration to the floor is eliminated or reduced. The reduction in transmission of vibration is not frequency dependent. All vibration frequencies are equally reduced. That is, if in a particular installation the transmission is reduced 75%, that percentage reduction applies to all frequencies.

The rotation of the complete device 1–7 about the axis 12 does not change the basic reciprocation of the tray 2 relative to the base 1. This basic reciprocation necessary for the operation of the complete device continues according to the law of action defined by its parts. The complete device rotates about the axis 12 using its inertia to reduce the transmission of vibration to the floor while at the same time the tray 2 reciprocates relative to the base 1 to accomplish the feeding, conveying, screening or other function for which the device was designed.

In FIGS. 2, 3, 4 and 7 corresponding parts are designated by the same reference numerals.

In FIG. 2, the base 1 is supported by links 17 arranged between floor brackets 16 and the base 1. The brackets 16 may be fixed to other supporting structure such as a unitary sub frame below the base 1. The links 17 may be rigid links pivoted at 18, 19 or may be flexible straps rigidly fixed at 18, 19 and flexing as the device rocks about the axis 12. This reduces the transmission of vibration to the brackets 16. The tray is reciprocated by a connecting rod 20 driven by an externally mounted motor 21. When the connecting rod is externally driven, the rocking motion of the base 1 about the point 12 is in phase with the force in the connecting rod, while when the connecting rod is internally driven, for example by being mounted on the base 1, the motion of the base 1 is out of phase with the motion of the tray.

In FIG. 3, the device is supported by links 22 pivoted to the base 1 at points 23 and pivoted to a supporting structure at the center of rotation 12. Since the center of gravity 13 of the device is above the center of rotation 12, springs 24 between the links and the floor are needed to provide static stability. This is achieved with only minor reduction in the isolation of vibratory forces. As in the previous constructions, the line of action 15 of the shaking forces passes through or in the region of the center of percussion 14.

In FIG. 4, elastomeric shear sandwiches 25, 26, 27 are arranged between brackets 28 fixed to the base 1 and floor brackets 29. Under load, the elastomer 27 shears, providing the same rocking movement about the center of rotation 12 as the previously described constructions. The elastomer introduces some force transmission to the floor but this can be kept to a low value. Each shear sandwich comprises a body 27 of elastomer sandwiched between and fixed to inclined surfaces 25 and 26 on the brackets 28 and 29. The surfaces 25 and 26 are generally normal to center planes passing through said surfaces and the axis 12. The surfaces of the sandwiches are inclined and diverge downwardly from each other as clearly shown in FIG. 4.

FIGS. 1–4 show the same basic vibratory device which in each case has a center of gravity 13, a center of rotation 12 on one side of the center of gravity and is subject to a reciprocating force having a line of action 15 on the other side of the center of gravity in the region of the center of percussion 14. In each case the device is operable with its base 1 fixed to a supporting structure and may be so used if transmission of vibration to the supporting structure is not objectionable. In each case the complete device, the base 1 and the parts mounted on the base, is supported for rotation so the reciprocating forces are spent in rocking the complete device about the center 12.

FIGS. 5 and 6 show diagrammatically other devices subject to reciprocating forces.

In FIG. 6, the device 38 is subjected to a reciprocating force in the direction of arrow 15 above the center of gravity 13 of the device by connecting rod 39 driven by a motor 40 mounted on an external supporting structure 41. To reduce the reaction of the shaking forces, the device 38 is mounted for rocking movement about an axis 12 below the center of gravity 13. Rollers 42 between inclined surfaces 43, 44 support the device for rocking movement. The axis 12 is chosen so that the line of action 15 passes substantially through the center of percussion of the device and the shaking forces do not cause any tangential reaction on the supporting structure 41.

In FIG. 5, the device 30 has a means for generating reciprocating forces consisting of a motor 31 driving a connecting rod 32 reciprocating a mass 33. The parts 30–33 are exposed or externally mounted on the device 30 but may be enclosed or internally mounted. The line of action 15 of the shaking forces is above the center of gravity 13 of the device. To reduce the reaction of the shaking forces, the device is mounted to a supporting structure 34 for rocking movement about an axis 12 below the center of gravity 13. Rollers 35 between inclined surfaces 36, 37 are used to support the device for a rocking movement but any of the other structures or other kinematic equivalents could be substituted. The axis 12 is chosen so the line of action 15 passes substantially through the center of percussion of the device. The shaking forces from the mass 33 do not cause any tangential reaction on the supporting structure 34 and merely cause rocking of the device about the axis 12.

Since vibratory feeders, conveyors, and screens function in substantially the same manner, the term vibratory feeder or the like is used to include these three devices.

The formula locating the center of rotation 12 so the line of action 15 of the shaking forces due to the tray passes through the center of percussion 14 is $$b = \left( a + \frac{r^2}{a} \right)$$

where $a$ is the distance from the line of action of the shaking forces to the center of gravity 13 of the feeder, and $r$ is the centroidal radius of gyration of the feeder about its center of gravity 13. The symbols "$a$," "$b$" and "$r$" are shown on FIG. 1.

In FIG. 7, the base 1 is supported by split rollers 45 rotatably seated in sockets 46 in the base and having flat surfaces 47 presented toward and in sliding engagement with inclined surfaces 48 on the supporting structure 8. As the base 1 rocks relative to the supporting structure 8, the split rollers 45 rotate in the respective sockets to maintain contact between the surfaces 47, 48. Obviously the split roller could be mounted in a socket on the supporting structure or two split rollers could be used respectively mounted in the base 1 and supporting structure 8 and having their flat surfaces presented toward and in sliding engagement with each other.

In all cases the vibration isolation requires no change in the basic design or operation of the device, which as an incident to its operation has applied thereto a reciprocating force having a resultant line of action on one side of the center of gravity of the device and tending to shake the device bodily or as a whole. If the device is fixed directly to a supporting structure, the shaking forces are transmitted directly to the supporting structure. To overcome this vibration transmission, it is not necessary to know its internal structure. The line of action of the reciprocating forces, the center of gravity of the device and its radius of gyration can each be ascertained without knowledge of the structure or internal operating parts of the device. Then vibration isolation is achieved by appropriate means between the base or frame of the device and its supporting structure for supporting the device as a whole for free bodily rocking movement about a center of rotation on the side of the center of gravity opposite the line of action of the reciprocating forces. When so supported, the device itself continues to be subject to the same reciprocating or shaking forces, but those forces are isolated from the supporting structure.

What is claimed as new is:

1. A device including base means by which it may be supported and reciprocating means for applying to the device a reciprocating force, said device having a center of gravity and the line of action of the reciprocating force being in a first plane spaced vertically on one side of the center of gravity, a supporting structure, and supporting means in load carrying relation between said base means and said supporting structure for supporting the device to allow free bodily rocking movement of the device as a whole about an axis in a second plane spaced vertically from the first plane and on the other side of the center of gravity of the device and transverse to said resultant line of action, said axis being chosen so the line of action of the reciprocating force is in the region of the center of percussion.

2. The device of claim 1 in which said axis lies in a plane containing the center of gravity of the device and at a perpendicular distance to the line of action of the reciprocating force acting on the device substantially equal to $$\left(a+\frac{r^2}{a}\right)$$

where $a$ is the distance from the resultant line of action of the shaking force acting on the device to the center of gravity of the device and $r$ is the centroidal radius of gyration of the device.

3. The structure of claim 1 where the supporting means is comprised of inclined surfaces downwardly diverging from each other and rollers riding in load carrying relation on said surfaces, the surfaces being generally normal to center planes passing through said rollers and said axis.

4. The structure of claim 1 where the supporting means is comprised of a body of elastomer between and fixed to inclined surfaces downwardly diverging from each other, said surfaces being generally normal to center planes passing through said surfaces and said axis and respectively fixed to said base means and to said supporting structure.

5. The structure of claim 1 in which the supporting means comprises links pivoted to the base means and to the supporting structure and converging towards said axis.

6. The structure of claim 5 having in addition spring means between said supporting structure and the base means resiliently resisting movement of the device from a central position.

7. The structure of claim 1 in which the supporting means comprises flexures connected to the base means and to the supporting structure and converging towards said axis.

8. The structure of claim 1 in which the supporting means comprises sliding surfaces engaging each other and respectively on the base means and on the supporting structure and substantially perpendicular to planes converging toward said axis.

9. The structure of claim 1 in which the reciprocating force is applied to the device by structure inside the device.

10. The structure of claim 1 in which the device is a vibratory feeder or the like having an elongated base, an elongated tray above the base, means for supporting the tray for reciprocating movement fore and aft of the base, and means for reciprocating the tray fore and aft relative to the base by reciprocating forces having a line of action above the center of gravity of the base and the parts supported by the base and in which the supporting means is interposed in load carrying relation between the base and the supporting structure.

11. The structure of claim 10 in which said axis lies in a plane containing the center of gravity of the device and at a perpendicular distance to the line of action of the reciprocating force acting on the device substantially equal to $$\left(a+\frac{r^2}{a}\right)$$

where $a$ is the distance from the resultant line of action of the shaking force acting on the device to the center of gravity of the device and $r$ is the centroidal radius of gyration of the device.

12. A device including base means by which it may be supported, said device having a center of gravity, structure outside the device for applying to the device a reciprocating force having a line of action in a plane spaced vertically on one side of the center of gravity, a supporting structure, and supporting means in load carrying relation between said base means and said supporting structure for supporting the device to allow free bodily rocking movement of the device as a whole about an axis in a second plane spaced vertically from the first plane and on the other side of the center of gravity of the device and transverse to said resultant line of action, said axis being chosen so the line of action of the reciprocating force is in the region of the center of percussion.

No references cited.

RICHARD E. AEGERTER, *Primary Examiner.*